United States Patent [19]

Strobel et al.

[11] 4,189,017
[45] Feb. 19, 1980

[54] WEIGHING APPARATUS INCLUDING DIGITALIZATION ERROR CORRECTING MEANS

[75] Inventors: Felix Strobel, Greifensee; Rudolf Stocker, Azmoos; Werner Zumbrunn, Volketswil, all of Switzerland

[73] Assignee: Mettler Instrumente AG, Greifensee, Switzerland

[21] Appl. No.: 937,720

[22] Filed: Aug. 29, 1978

[30] Foreign Application Priority Data

Sep. 20, 1977 [CH] Switzerland ................. 11466/77

[51] Int. Cl.² ........................................... G01G 7/00
[52] U.S. Cl. ............................. 177/212; 177/210 EM
[58] Field of Search ......... 177/212, 210 EM, DIG. 3

[56] References Cited

U.S. PATENT DOCUMENTS

| | | | |
|---|---|---|---|
| 3,786,678 | 1/1974 | Kunz | 177/212 X |
| 3,786,883 | 1/1974 | Kunz | 177/212 X |
| 3,786,884 | 1/1974 | Allenspach | 177/210 |
| 3,816,156 | 6/1974 | Baumann | 177/212 X |
| 3,986,571 | 10/1976 | Strobel | 177/210 |
| 4,062,417 | 12/1977 | Kunz | 177/212 X |

*Primary Examiner*—Joseph W. Hartary
*Attorney, Agent, or Firm*—Lawrence E. Laubscher

[57] ABSTRACT

An improved weighing apparatus of the electromagnetic load compensation type is disclosed, including a correction loop connected between the output terminal of the synchronizer and the input terminal of the pulse length modulator for varying the regulated load signal from the PID regulator to produce a corrected regulated load signal which compensates for digitalization errors produced by the synchronizer. In one embodiment, the correction loop includes an integrator circuit for superposing on the regulated load signal an inverted integrated error voltage the magnitude of which is a function of the operation of the synchronizer relative to the mark signals. In a second embodiment, the correction loop includes an integrator circuit that periodically applies to the regulated load signal a constant reference voltage of opposite polarity. Preferably, the reference voltage is applied simultaneously with the periods of supply of the compensation current.

8 Claims, 6 Drawing Figures

WEIGHING APPARATUS INCLUDING DIGITALIZATION ERROR CORRECTING MEANS

BRIEF DESCRIPTION OF THE PRIOR ART

Weighing apparatus of the electromagnetic load compensation ("return-to-zero") type are well known in the patented prior art, as taught, for example, by the U.S. patents to Kunz U.S. Pat. Nos. 3,786,678 and 3,786,883, Allenspach U.S. Pat. No. 3,786,884, Baumann et al U.S. Pat. No. 3,816,156, Strobel et al U.S. Pat. No. 3,986,571 and Kunz U.S. Pat. No. 4,062,417.

As taught by the aforementioned Allenspach U.S. Pat. No. 3,786,884, the electrical scale is provided with a load compensation coil that is supplied with current pulses from a constant current source via a periodically operable current switch. This current switch is operable by a load position signal that is regulated and supplied to a pulse length modulator for comparison with a sawtooth voltage, thereby to determine the length of the compensating current pulses. The lengths of the compensating current pulses are measured by the counting of timing mark pulses supplied by an oscillator. Synchronizer means are provided for synchronizing the output from the comparator (i.e., the pulse length modulator) with the timing mark signals. In this system, instead of digitalizing an analog weighing result, digitalization is built into the regulator circuit. For reasons of the clear connection between the pulse duration and the number of time markers, it is necessary, after the coincidence between the regulator signal and the comparison signal, to wait for the next time marker before the compensation current can be turned off. From this small time difference there results an error which must again be compensated for via the relatively inert mechanical-electrical regulator circuit. This compensation requires a large number of pulse periods (ramps) and comes as a periodic fluctuation around the "correct" mean value whose amplitude can amount to a two-digit number of time markers. This so-called digitalization error plays no role as long as the indication resolution is small when compared with the time marker frequency, and, conversely, it appears as a fluctuating reading when the indication resolution is relatively high with respect to the time marker frequency, in each case related to a given integration time (corresponding to the number of current pulses counted out per weighing result). It furthermore has a disturbing effect when the visible indication remains constant, but when, for example, on the basis of calibration regulations, even an invisible decimal should reveal a certain stability.

Now, it is theoretically possible to keep the digitalization error as small as desired by means of a corresponding choice of the time marker frequency. But there are some essential disadvantages which prevent the practical application of this possibility. Thus, for example, the effort connected with an increase in the time marker frequency, in the Megahertz range, increases disproportionately rapidly. Furthermore, the use of modern components (for example, computer building blocks or microprocessors) encounters problems in digital analysis and control when the time marker frequency becomes too high.

Another possibility is to increase the integration time until the digitalization error no longer appears in any noteworthy fashion. This possibility is restricted by the requirement for short weighing time.

SUMMARY OF THE INVENTION

In order to avoid the above drawbacks, there was presented the task of reducing the digitalization error without increasing the time marker frequency and without extending the integration time. To solve this problem, the invention suggests that—in a scale of the kind described initially—one additional regulator correction loop, bridging the load receiver, be provided within the mechanical-electrical regulator circuit. In this way the mechanical inertia is eliminated to such an extent that, in the steady state (with the scale in balance), the digitalization error is more or less short-circuited and is stabilized much faster.

Accordingly, a primary object of the present invention is to provide an improved weighing apparatus of the electromagnetic load compensation type including correction loop means for modifying the regulated load signal supplied to the pulse length modulator to compensate for digitalization errors produced by the synchronization means. In one embodiment of the invention, the correction loop means includes integrator means for superposing an inverted error voltage on the regulated load signal, the magnitude of the error voltage being a function of the time increment of the digitalization error. In a second embodiment, the correction loop means includes integrator means for periodically applying to the regulated load voltage a constant reference voltage of opposite polarity. Preferably, the reference voltage is applied simultaneously with the application of the compensating current pulses to the compensation coil.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
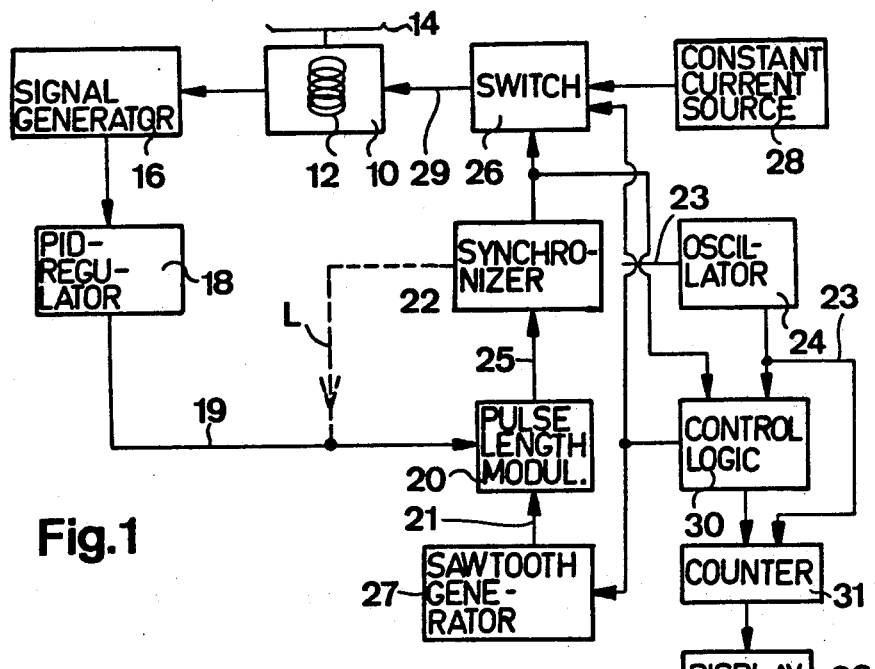
FIG. 1 is a block diagram of a conventional weighing system of the load compensating type.
Figure 2:
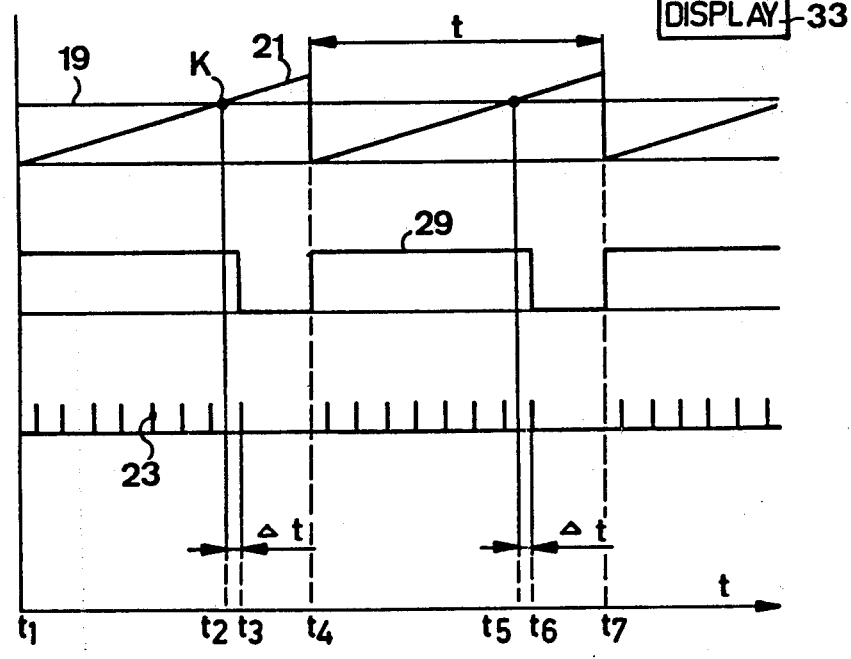
FIG. 2 is a timing diagram indicating the operation of the apparatus of FIG. 1.

Referring first more particularly to FIGS. 1 and 2, the known weighing system of the electromagnetic load compensation type includes periodically operable compensating current switch means 26 for supplying compensating current from the constant current source 28 to the compensation coil 12, whereby a compensation force is produced for returning the movable weighing member to its initial no-load position. More particularly, position sensing means 16—which sense the displacement of the movable member from its normal no-load position—generate a load-responsive signal that is regulated by the PID regulator 18. The regulated load signal 19 is supplied to the pulse length modulator 20 where it is compared with the sawtooth signal 21 produced by the sawtooth generator 27. The output signal from PLM 20 is connected with one input of the synchronizer 22, and oscillator 24 supplies timing mark signals 23 to the other input of the synchronizer, together with reduced frequency signals to the sawtooth generator 27. The timing mark signals 23 are counted by the counter 31 for display by the load indicating means 33. Logic control circuit 30 controls the operation of the sawtooth generator 27 and the counter 31, as described in the aforementioned patents to Kunz U.S. Pat. No. 3,786,678 and Allenspach U.S. Pat. No. 3,786,884.

As shown in FIG. 2, at the beginning of the first sawtooth ramp at time $t_1$, switch 26 is closed to supply compensation current from source 28 to the compensation coil 12, and time marker pulses 23 are counted by the counter 31 for display by the load indicating means 33. At the point of coincidence K ($t_2$), the regulated load voltage 19 equals the sawtooth voltage 21, and upon the occurrence of the next time marker 23 (at time $t_3$), the synchronizer 22 causes switch 26 to open to interrupt the supply of compensating current to the compensating coil 12. As shown in FIG. 2, during the time period between $t_2$ and $t_3$, a small digitalization error $\Delta t$ is produced during each sawtooth ramp. During a typical integration interval involving several hundred sawtooth ramps t, (for example, sawtooth period of t=2 ms, integration time of 1 s), the total digitalization error might be on the order of 50 time marks. Thus, if 10 time marks of an indication unit correspond to the last visible digit, then a fluctuation of the reading (i.e., the digitalization error) by 5 units of the last visible digit might occur. The operation of the known system is disclosed in greater detail in the aforementioned Allenspach U.S. Pat. No. 3,786,884.

Figure 3:
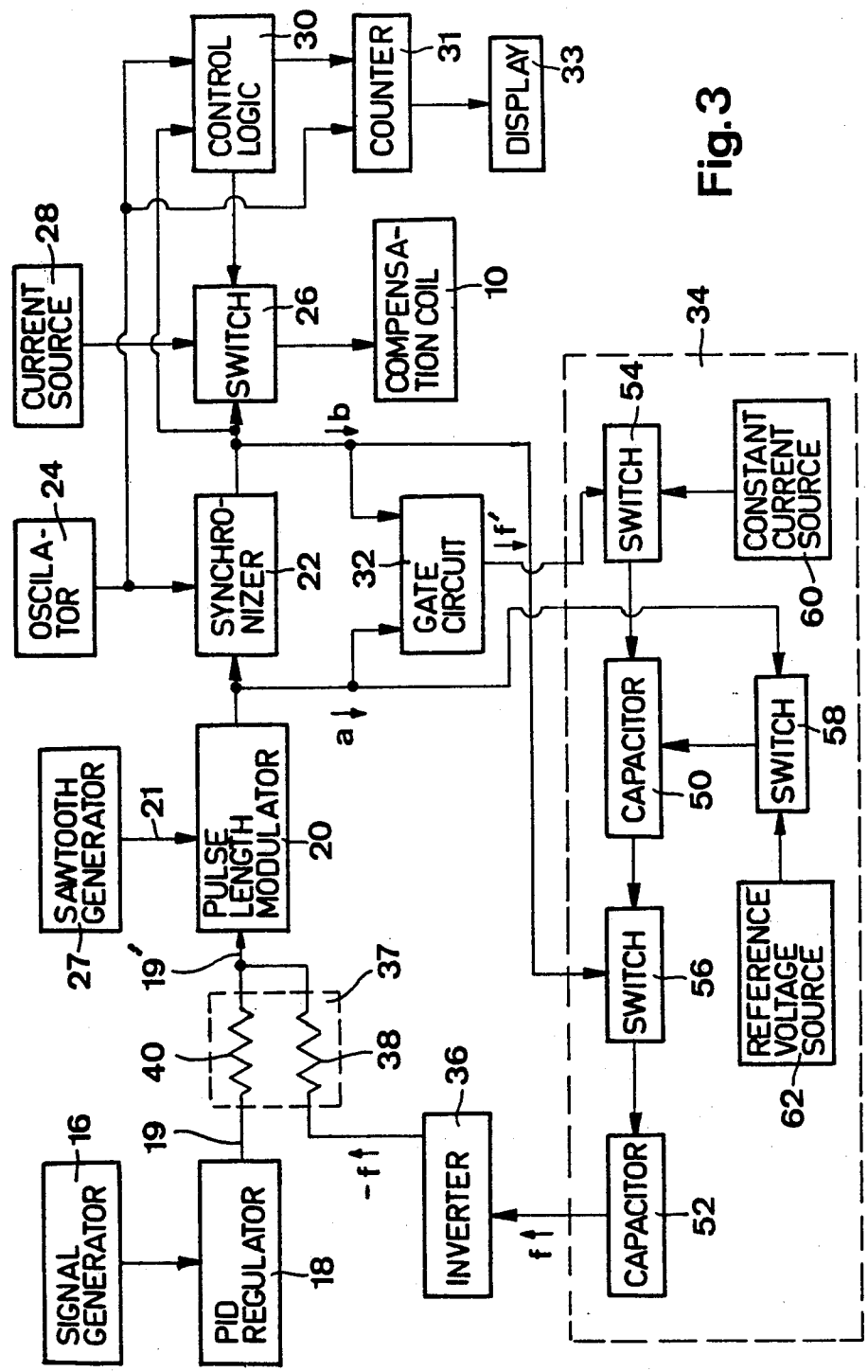
FIG. 3 is a detailed block diagram of a first embodiment of the error correcting circuit of the present invention.
Figure 4:
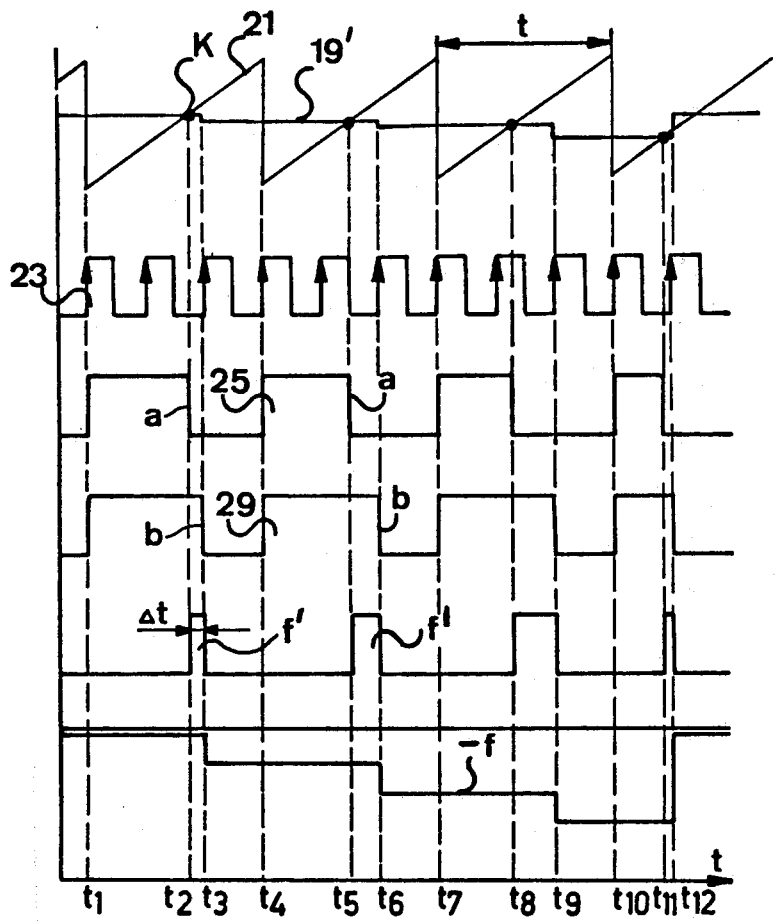
FIG. 4 is a timing diagram illustrating the operation of the circuit of FIG. 3.

Referring now to FIGS. 3 and 4, in accordance with a first embodiment of the present invention, correction loop means including the integrator circuit 34 are connected between the output of the synchronizer 22 and the input of the pulse length modulator 20 for modifying the regulated signal 19 to produce a corrected regulated load signal 19' which compensates for the digitalization error produced by the synchronizer. More particularly, gate circuit 32 is provided having inputs connected across the synchronizer 22, said gate circuit having an output which controls a normally open first switch 54 through which constant current source 60 is connected with a first capacitor 50. The first capacitor is connected with a second capacitor 52 via a normally open second switch 56 that is controlled by the synchronizer output, which capacitor 52 is connected with the input to pulse length modulator 20 via inverter 36, and resistor 38 of the voltage divider 37. A reference voltage source 62 is connected with first capacitor 50 via a normally open third switch 58 that is operable by a further input signal to the synchronizer as will be described below. The integration circuit 34 is operable to produce an error voltage output f the magnitude of which is a function of the incremental digitalization error time period $\Delta t$ (i.e., the width of the pulse signal f' appearing at the output of gate circuit 32). The error voltage f is inverted by inverter 36 and is superposed on the regulated load voltage 19 to produce a corrected regulated load voltage 19:

Referring to FIG. 4, at time $t_1$ (when the time mark signal 23 goes high), a sawtooth ramp 21 is initiated, whereupon the compensating current switch 26 is closed to supply compensating current to the coil 12, and the counting of time mark signals 23 by the counter 31 is initiated. Switch 56 is in the open condition, and switch 58 is closed to discharge capacitor 50 to the value of the reference voltage source 62.

At time $t_2$ (i.e., at the point of coincidence K between the regulated load voltage 19' and the sawtooth ramp voltage 21), the input signal 25 to the synchronizer 22 goes low to provide the pulse "a" to the gate circuit 32, thereby starting the digitalization error period $\Delta t$. Switch 58 is then opened, and switch 54 is closed by the signal f' from the gate circuit 32 to supply charging current to capacitor 50 from constant current source 60.

At time $t_3$ (at the start of the next timing mark 23), the output signal 29 from synchronizer 22 goes low (trailing edge "b"), whereupon compensation current switch 26 opens, the counting of the timing marks 23 is terminated, switch 54 is opened, and switch 56 is closed to transfer to second capacitor 52 the charge stored on capacitor 50. Capacitor 52 then holds the charge which supplies the error voltage f having a magnitude that is a function of the digitalization error period $\Delta t$ (i.e., the width of the digitalization error f'). The error signal f is inverted by inverter 36 and is superposed in the regulated load voltage 19 to produce the reduced corrected regulated load voltage 19'.

At time $t_4$ (when the next ramp 21 is initiated by an upward timing mark 23), the signals 25 and 29 go high to produce pulses "a" and "b" that go high, whereupon switch 26 closes to supply compensating current to the coil 12, timing marks 23 are again counted, switch 56 is opened, and switch 58 closes to again discharge capacitor 50 to the reference voltage. At this integration process continues during the time period $t_4$-$t_{10}$, the digitalization error time intervals f' progressively increase, the magnitude of the error voltage f progressively increases, and the magnitude of the corrected regulated load voltage 19' progressively is reduced relative to the sawtooth ramps 21, with the result that the point of coincidence K occurs progressively earlier relative to the start times of the sawtooth ramps 21. Finally, at time $t_{11}$, the point of coincidence K has been advanced to a time just prior to the next timing mark signal 23 (at time $t_{12}$). Thus, at time $t_{11}$, the digitalization error period $\Delta t$ is commenced, switch 58 is opened, and switch 54 is closed. Since the next time mark 23 occurs so soon (at time $t_{12}$), the charge transferred to capacitor 52 is relatively low, and capacitor 52 discharges correspondingly, whereupon the error voltage f is low, and the regulated load voltage approximately returns to its initial value 19.

Consequently, the error time interval f', and thus the error voltage $-f$, will increase from ramp to ramp until, in the event of a sufficient shortening of the pulse duration, one less time marker 23 will be coming in and will be counted. Consequently, the error time interval f', and thus also the error voltage $-f$, decline abruptly (at $t_{12}$). Thus, the digitalization error, independently of the magnitude $\Delta t$, no longer becomes greater than one time marker. Accordingly, independently from the integration time and the time marker frequency, the fluctuation of the reading only amounts to the counter value of one time marker. This counter value can be in a decimal or other ratio to the time marker.

Figure 5:
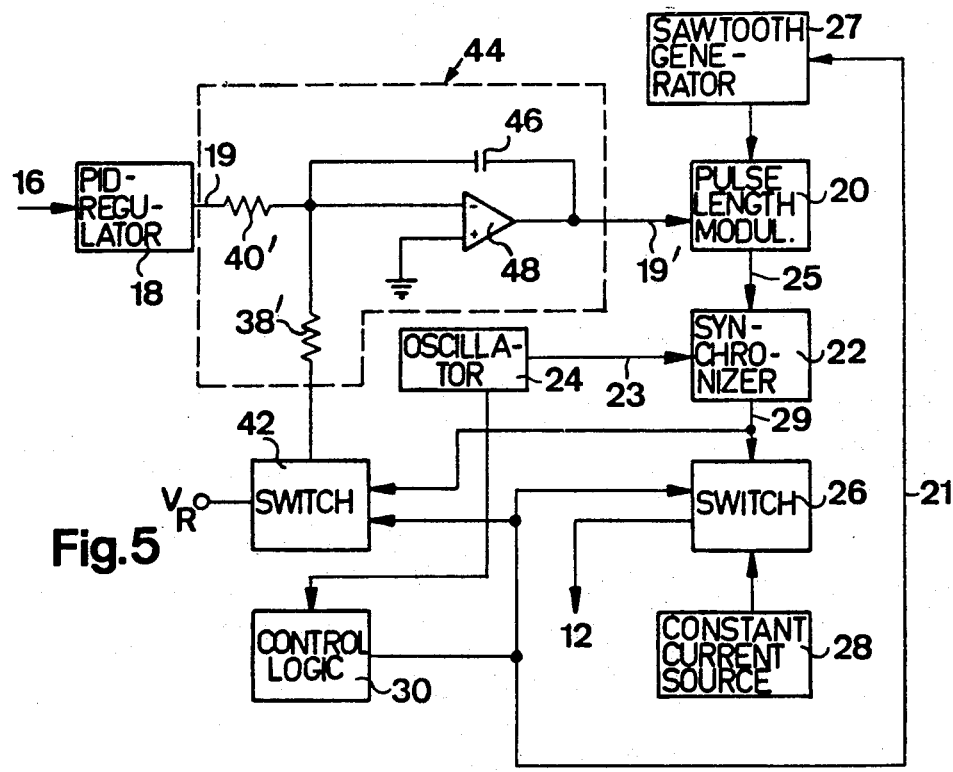
FIG. 5 is a second embodiment of the error correcting circuit of the present invention.
Figure 6:
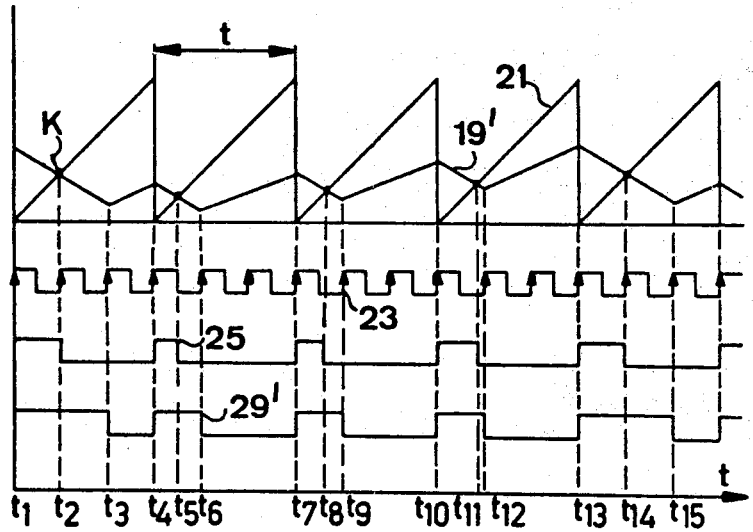
FIG. 6 is a timing diagram illustrating the operation of the circuit of FIG. 5.

Referring now to the embodiment of FIGS. 5 and 6, an integrating circuit 44 is connected between the output of the PID regulator 18 and the input to the pulse length modulator 20 for correcting the regulated load signal 19 to produce a corrected regulated load signal 19'. More particularly, the output terminal of the PID regulator 18 is connected via resistor 40' with one input terminal of the amplifier 48 the output terminal of which is connected with one input terminal of the pulse length modulator 20. The input and output terminals of the amplifier are bridged by the capacitor 46, and switch means 42 are provided for connecting the reference voltage source $V_R$ with the input terminal of amplifier 48 via resistor 38', the polarity of the reference voltage source $V_R$ being opposite that of the regulated load signal 19. Preferably switch 42 is operable simultaneously with the compensation current switch 26 as controlled by the pulse length modulator 20 and control logic 30. Owing to the periodic superposition of the reference voltage $V_R$ on the regulated load voltage 19 (which is constant in the equilibrium state of the balance), an irregular triangular corrected load voltage 19' is produced as shown in FIG. 6.

It will be clear that when sawtooth ramp 21 is initiated with switches 26 and 42 closed, simultaneously, the compensation current now is supplied to coil 12, and current is supplied from reference voltage source $V_R$ to the integrator 44, thereby producting an "off-integration" (i.e., "down-integration") condition. The amount of the reference voltage (when the resistances 38' and 40' are equal) must be greater than the greatest possible value of the regulator voltage. At coincidence point K (time $t_2$), the corrected voltage 19' intersects ramp 21, and it continues to drop until the occurence of the next rising time marker flank (time $t_3$). At the moment synchronizer 22 brings about the simultaneous opening of switches 26 and 42, and once again only the regulator voltage 19 is applied to the integrator input, until the next ramp 21 is started up.

As shown in FIG. 6, the lengths of the modulated signals 25 correspond to the time between the start of each ramp 21 and the point of coincidence K. The lengths of the compensation current pulses 29' are longer than the intervals 25, owing to the operation of the synchronizer by the next rising time marker. They are reduced abruptly, when the error becomes greater than the difference between two time markers. The digitalization error is thus reduced to the value of one time marker (as in the embodiment of FIGS. 3 and 4).

It goes without saying that FIGS. 2, 4, and 6 are not drawn to scale. Especially time markers 23 were illustrated in a heavily magnified manner in order to clarify the way in which they work. In reality, one ramp 21 has many more time markers 23 (for example, in case of a ramp time t of 2 ms and a stroke frequency of 2 MHz, there would be about 1,000 time markers).

It should be noted that, while in FIG. 4 the backjump of correction voltage -f occurs at time $t_{12}$, in FIG. 6 the change from the longest signal 25 to the shortest one occurs between times $t_2$ and $t_4$.

Generally the correction interval $\Delta t$, determined by the outputs of PLM 20 and synchronizer 22, cannot exceed in time the period of one timing mark pulse. Thus, since the correction by the additional control loop L takes place immediately within each ramp period, the overall digitalization error over a full integration period likewise cannot exceed the value of one timing mark pulse.

What is claimed is:
1. In a weighing system of the electromagnetic load compensation type including
   (a) a load compensation coil (12) connected with the movable weighing member;
   (b) means for periodically supplying said coil with compensation current for periods of time that correspond with the magnitude of the applied load, including
      (1) normally open compensating current switch means (26) for connecting said coil with a constant current source (26);
      (2) signal generator means (16) associated with said movable weighing member for generating a position signal;
      (3) regulator means (18) for regulating said position signal to produce a regulated signal (19) that is a function of the load to be measured;
      (4) sawtooth voltage generator means (27) for producing a sawtooth voltage (21);
      (5) pulse length modulator means (20) responsive to said regulated load signal and said sawtooth voltage for producing a train of control signals (25) the lengths of which correspond with the magnitude of the regulated load signal;
      (6) means (24) for producing a series of timing mark pulses (23); and
      (7) synchronizer means (22) responsive to said timing mark pulses (23) and said control signals (25) for periodically closing said compensating current switch means; and
   (c) load indicating means (33) including counter means (31) for counting the timing mark pulses during the periods when said switch means is in the closed condition, thereby affording an indication of the magnitude of the applied load;
the improvement which comprises
   (d) correction loop means for varying said regulated load signal to correct for digitalization errors produced by said synchronizer means.

2. Apparatus as defined in claim 1, wherein said correction loop means includes signal integrator means (34; 44) connected between the output of said synchronizer means and the input of said pulse length modulator means for varying the magnitude of the regulated load signal to compensate for the digitalization errors produced by said synchronizer means.

3. Apparatus as defined in claim 2, wherein said correction loop means is operable to superpose on said regulated load signal (19) an integrated error voltage (f) the magnitude of which is a function of the digitalization error time increment.

4. Apparatus as defined in claim 3, and further including inverter means (36) connected between said integrator means and said pulse length modulator means (20) for effecting subtraction of the integrated error signal from the regulated load signal.

5. Apparatus as defined in claim 4, wherein said integrator means includes a first capacitor (50), and first switch means (54) for connecting said first capacitor with a constant current source; and further including gate means (32) responsive to the input and output signals of said synchronizer means for operating said first switch means.

6. Apparatus as defined in claim 5, wherein said integrator means further includes a second capacitor (52), normally-open second switch means (56) operable by the output signal of said synchronizer for transferring the charge on said first capacitor to said second capacitor, a reference voltage source (62), and normally open third switch means (58) operable by the input signal to said synchronizer means for connecting said first capacitor with said reference voltage source.

7. Apparatus as defined in claim 2, wherein said correction loop means is operable to apply periodically to said regulated load signal (19) a reference voltage ($V_R$).

8. Apparatus as defined in claim 7, wherein said reference voltage applying means comprises a reference voltage source having a polarity opposite that of said regulated load signal, normally-open first switch means (42) for connecting said reference voltage source with said integrator means, and means for closing said first switch means simultaneously with the operation of said compensating current switch means.

* * * * *